US010446127B2

(12) United States Patent
Wilson, Jr.

(10) Patent No.: US 10,446,127 B2
(45) Date of Patent: Oct. 15, 2019

(54) DJ APPARATUS INCLUDING AN INTEGRATED REMOVABLE FADER COMPONENT

(71) Applicant: Sidney G. Wilson, Jr., Des Moines, IA (US)

(72) Inventor: Sidney G. Wilson, Jr., Des Moines, IA (US)

( * ) Notice: Subject to any disclaimer, the term of this patent is extended or adjusted under 35 U.S.C. 154(b) by 0 days.

(21) Appl. No.: 15/765,205

(22) PCT Filed: Sep. 30, 2016

(86) PCT No.: PCT/US2016/054887
§ 371 (c)(1),
(2) Date: Mar. 30, 2018

(87) PCT Pub. No.: WO2017/059301
PCT Pub. Date: Apr. 6, 2017

(65) Prior Publication Data

US 2018/0277079 A1 Sep. 27, 2018

Related U.S. Application Data

(60) Provisional application No. 62/236,498, filed on Oct. 2, 2015.

(51) Int. Cl.
*G10H 1/18* (2006.01)
*G10H 1/36* (2006.01)
(Continued)

(52) U.S. Cl.
CPC ............. *G10H 1/0091* (2013.01); *G10H 1/32* (2013.01); *G10H 1/46* (2013.01);
(Continued)

(58) Field of Classification Search
CPC ............... G10H 2210/241; G10H 1/40; G10H 2250/035; G10H 1/18; G10H 1/361; G10H 7/008; G10H 2210/155
See application file for complete search history.

(56) References Cited

U.S. PATENT DOCUMENTS 6,447,461 B1 * 9/2002 Eldon .................... A61B 5/121 600/559
9,415,308 B1 * 8/2016 Zepp ....................... A63F 13/25
(Continued)

OTHER PUBLICATIONS

International Search Report for corresponding International Application No. PCT/US2016/054887, dated Dec. 15, 2016, 3 pages.

*Primary Examiner* — Marlon T Fletcher
(74) *Attorney, Agent, or Firm* — Ditthavong & Steiner, P.C.

(57) ABSTRACT

An apparatus is provided for integrating a removable fader component with an audio component while also enabling the fader component to be connected with one or more external audio components and/or to function as a standalone fader when removed from the apparatus. Embodiments include an audio component configured to produce a first audio signal; a removable fader component configured with a first connection point for connectivity to the audio component and a second connection point for connectivity to an external audio component that produces a second audio signal, wherein a hardware component, a software component, or a combination thereof for performing a mixing of the first audio signal and the second audio signal is contained within the removable fader component; and a receptacle integrated into the apparatus, wherein the receptacle is configured to hold the removable fader component to the apparatus.

20 Claims, 19 Drawing Sheets

(51) Int. Cl.
*G10H 1/00* (2006.01)
*G10H 1/46* (2006.01)
*G10H 1/32* (2006.01)

(52) U.S. Cl.
CPC . *G10H 2210/125* (2013.01); *G10H 2210/241* (2013.01); *G10H 2250/035* (2013.01)

(56) References Cited

U.S. PATENT DOCUMENTS

| | | | | |
|---|---|---|---|---|
| 2005/0259532 | A1 | 11/2005 | Roman et al. | |
| 2005/0286213 | A1* | 12/2005 | Rooney | G06F 3/021 361/679.02 |
| 2008/0215763 | A1* | 9/2008 | Adam | G11B 27/34 710/1 |
| 2008/0226099 | A1* | 9/2008 | Aiso | H04H 60/04 381/119 |
| 2010/0180224 | A1* | 7/2010 | Willard | G10H 1/0025 715/773 |
| 2010/0216547 | A1 | 8/2010 | Coppard et al. | |
| 2011/0261972 | A1 | 10/2011 | Komm | |
| 2012/0109348 | A1 | 5/2012 | Matsunaga et al. | |
| 2012/0130516 | A1* | 5/2012 | Reinsch | G06F 17/00 700/94 |
| 2012/0143360 | A1 | 6/2012 | Henneberg et al. | |
| 2013/0266155 | A1* | 10/2013 | Mashita | H04R 3/00 381/119 |
| 2013/0322654 | A1* | 12/2013 | Okabayashi | H04R 3/00 381/119 |
| 2014/0064519 | A1* | 3/2014 | Silfvast | H04H 60/04 381/119 |
| 2014/0126750 | A1* | 5/2014 | Kitayama | H04H 60/04 381/119 |
| 2014/0129013 | A1* | 5/2014 | Ochi | G06F 17/30778 700/94 |
| 2016/0086589 | A1* | 3/2016 | Moriyama | G10H 1/0066 84/602 |
| 2016/0140863 | A1* | 5/2016 | Hermez | G09B 15/06 |
| 2016/0306536 | A1* | 10/2016 | Suzuki | G06F 3/04842 |
| 2017/0208112 | A1* | 7/2017 | Arrington | H04L 12/10 |
| 2017/0264385 | A1* | 9/2017 | Anderson | H04H 60/04 |
| 2018/0190250 | A1* | 7/2018 | Hiskey | G10H 1/0066 |
| 2018/0248635 | A1* | 8/2018 | Saito | H04H 60/04 |
| 2018/0277079 | A1* | 9/2018 | Wilson, Jr. | G10H 1/0091 |

* cited by examiner

DJ APPARATUS INCLUDING AN INTEGRATED REMOVABLE FADER COMPONENT

CROSS-REFERENCE TO RELATED APPLICATION

This application claims the benefit of U.S. Provisional Patent Application No. 62/236,498, titled "AN INTEGRATED REMOVABLE FADER," filed Oct. 2, 2015, the entire disclosure of which is hereby incorporated by reference herein.

TECHNICAL FILED

The present disclosure relates to a disc jockey (DJ) apparatus including an integrated removable fader component.

BACKGROUND

Musicians and DJs often combine or manipulate audio signals from one or more sources (e.g., a record player, a digital disc jockey (DDJ) device, a compact disc player, a digital media player, a smartphone, a tablet computer, a laptop computer, a drumbeat machine, a piano keyboard, etc.). An important aspect of combining or manipulating audio signals is the ability to control the level or volume of the one or more sources. Traditionally, a volume control device or fader has been connected to an audio source or input (e.g., a record player) to allow a user to fade in or increase the level of an audio source and/or to fade out or decrease the level of an audio source. A cross-fader enables a user to simultaneously control two audio sources. For example, the user can fade in or out one source while fading in or out another source and, therefore, create a unique mixture or combination of the two sources. A user may also manipulate the audio signals from one or more sources (e.g., a record player) by "scratching." Scratching or scrubbing is a known process whereby a user (e.g., a DJ) manipulates the playback of an audio source (e.g., a record player) by hand while optionally manipulating a fader connected to that audio source.

Musicians like any artist are often particular about the functionality, flexibility, and overall quality of their instruments and devices. Because musicians often travel between venues, studios, etc., the portability of their equipment in terms of the size, weight, and seamless integration with various other components is an important factor. Traditional faders are often expensive, bulky, and most commonly used within the confines of a recording studio. Portable faders often lack the ability to be physically integrated with other audio components and, therefore, largely remain auxiliary components. In addition, portable faders often lack flexibility in terms of supporting personal preferences and/or customization. Further, traditional audio sources (e.g., a standard record player) likewise often lack the hardware/software components required to enable the audio source to be easily connected to and/or integrated with one or more related audio components (e.g., a removable fader, a drumbeat machine, a piano keyboard, recording software, a touchscreen, or the like).

A need therefore exists for an apparatus enabling a removable fader component to be physically integrated with an audio component while also enabling the fader component to be connected with one or more external audio components and/or to function as a standalone fader when removed from the apparatus.

SUMMARY

An aspect of the present disclosure is an apparatus including an audio component, a removable fader component, and a receptacle configured for integrating the removable fader component with the audio component while also enabling the fader component to be connected with one or more external audio components and/or to function as a standalone fader when removed from the apparatus.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by an apparatus including: an audio component configured to produce a first audio signal; a removable fader component configured with a first connection point for connectivity to the audio component and a second connection point for connectivity to an external audio component that produces a second audio signal, wherein a hardware component, a software component, or a combination thereof for performing a mixing of the first audio signal and the second audio signal is contained within the removable fader component; and a receptacle integrated into the apparatus, wherein the receptacle is configured to hold the removable fader component to the apparatus.

Aspects of the present disclosure include the removable fader component being enclosed within a fader housing that provides access to the first connection point and the second connection point, and wherein the removable fader component is operable as a standalone fader when removed from the apparatus. Additional aspects include the receptacle being located on an outer edge of the audio component, within a recessed portion of the audio component, or a combination thereof such that an upper surface of the fader housing is substantially flush with an upper surface of the audio component. Another aspect includes a shape of the recessed portion conforming to a shape of the fader housing. Other aspects include the removable fader component and/or a knob of the removable fader component including one or more features to indicate where the knob and associated source priority between the first audio signal and the second audio signal are in relation to the fader housing. Further aspects include the removable fader component including a button or switch to change the associated source priority. Another aspect includes more than one receptacle being integrated into the apparatus.

Other aspects include a location of the receptacle vertically aligning the removable fader component and a knob of the removable fader component with one or more audio controls of the audio component. Further aspects include the receptacle being movable relative to the audio component to enable the removable fader component to be held in more than one location relative to the audio component. Additional aspects include each of the more than one location vertically aligning the removable fader component and a knob of the removable fader component with one or more audio controls of the audio component. Another aspect includes the first connection point and the second connection point including an analog connection, a digital connection, or a combination thereof. Other aspects include the audio component including a separate hardware component, software component, or a combination thereof for connecting the audio component to the external audio component by the analog connection, the digital connection, or a combination thereof. Further aspects include the analog connection, the digital connection, or the combination thereof being a proprietary design. Additional aspect include the digital connection being a Universal Serial Bus (USB) connection. Another aspect includes the digital connection between the removable fader component and the external audio component being a short-range wireless connection. Other aspects include wherein the removal fader component is connected to an external audio component by the short-range wireless connection, the external audio component including a smartphone, a laptop computer, a tablet computer, a wireless speaker, or any device capable of transmitting one or more digital files via the short-range wireless connection. Further aspects include the hardware component, the software component, or the combination thereof providing for a user customization of the first connection point, the second connection point, or a combination thereof to facilitate connectivity of the removable fader component to the audio component, the external audio component, or a combination thereof. Additional aspects include the hardware component, software component, or a combination thereof providing for a user customization of one or more performance characteristics of the removable fader component. Another aspect includes the user customization being available while the removable fader is held by the receptacle or removed from the apparatus. Other aspects include the audio component, the external audio component, or a combination thereof including a record player, a digital disc jockey (DDJ) device, a compact disc player, a digital media player, a smartphone, a tablet computer, a laptop computer, a drumbeat machine, a piano keyboard, recording software, a touch screen, or a wireless speaker. Further aspects include wherein the audio component is the record player, a headshell of the record player being configured for one or more weights to be attached to the headshell. Additional aspects include the one or more weights being configured to be connected together before being attached to the headshell.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the current problems of traditional faders often being expensive, bulky, and often limited to the confines of a recording studio; portable faders often lacking the ability to be seamlessly integrated with other audio components and/or the flexibility to support personal preferences; and traditional audio sources often lacking the hardware/software components required to enable the audio source to be easily connected to and/or integrated with one or more related components attendant upon manipulating or mixing the playback of one or more an audio sources.

An apparatus in accordance with embodiments of the present disclosure includes an audio component configured to produce a first audio signal. A removable fader component is configured with a first connection point for connectivity to the audio component and a second connection point for connectivity to an external audio component that produces a second audio signal, wherein a hardware component, a software component, or a combination thereof for performing a mixing of the first audio signal and the second audio signal is contained within the removable fader component. A receptacle is integrated into the apparatus, wherein the receptacle is configured to hold the removable fader component to the apparatus.

Figures 1A, 1B:
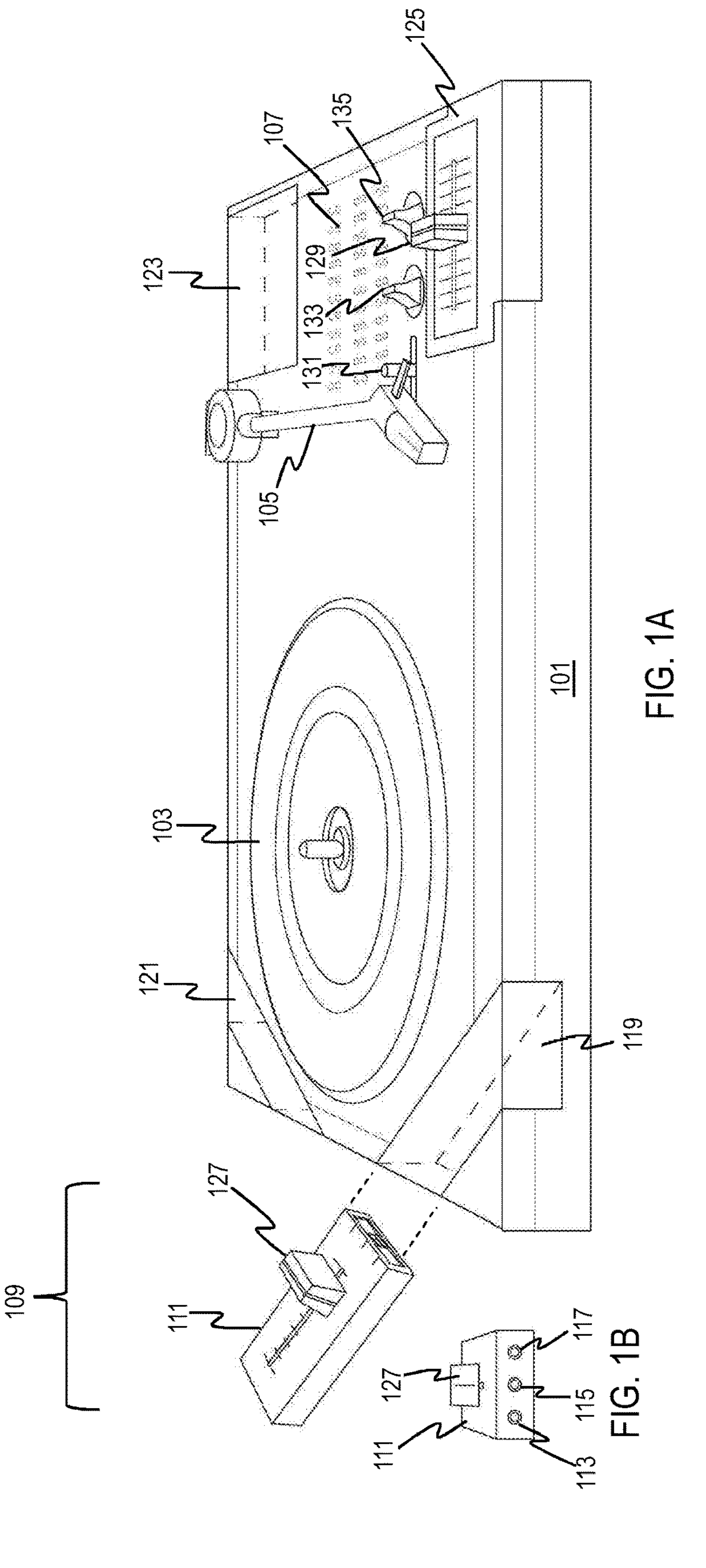
FIGS. 1A through 1C schematically illustrate a removable fader component integrated with an audio component via a recessed receptacle and one or more analog connections, one or more digital connections, or a combination thereof, according to one embodiment.
Figure 1C:
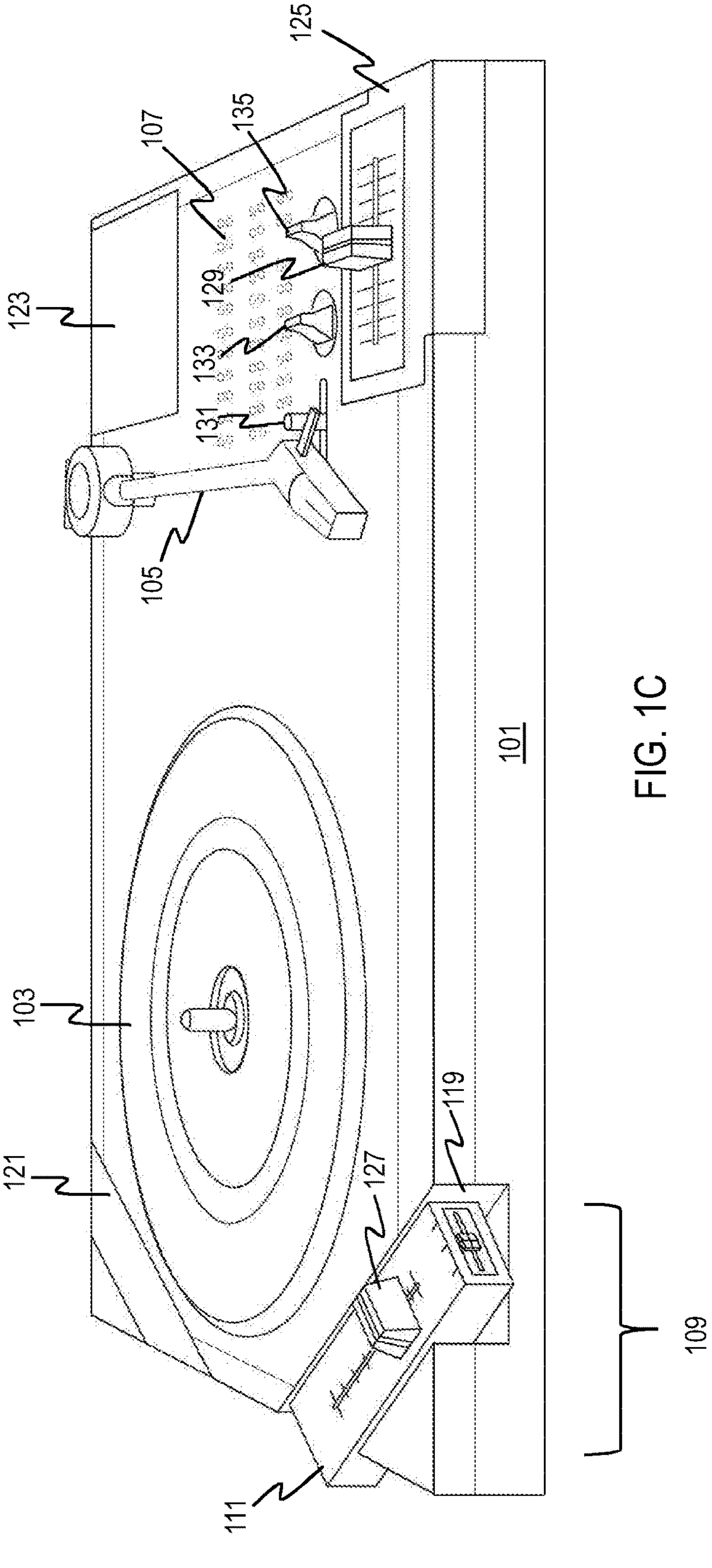

FIGS. 1A through 1C (axiomatic views) schematically illustrate a removable fader component integrated with an audio component via a recessed receptacle and one or more analog connections, one or more digital connections, or a combination thereof, according to one embodiment. In one embodiment, an audio component 101 (e.g., a record player, a DDJ, a compact disc player, a digital media player, or the like) is configured to produce an audio signal (e.g., music). For example, an audio signal may be produced as a result of an interaction between a vinyl record (not shown for illustrative convenience) placed on the turntable 103, the tone arm 105 including a needle (not shown for illustrative convenience), and the speaker 107. In one embodiment, the removable fader component 109 (e.g., a contact fader, a digital fader, or a contactless crossfader) is enclosed within the fader housing 111. In one embodiment, the fader 109 is configured with a first connection point (e.g., an audio input or first channel 113) for connectivity to the audio component 101 (e.g., a record player) and a second connection point (e.g., an auxiliary port or second channel 115) for connectivity to an external audio component (e.g., a record player, a DDJ device, a compact disc player, a digital media player, a smartphone, a tablet computer, a laptop computer, a drumbeat machine, a piano keyboard, recording software, a touch screen, or the like) (not shown for illustrative convenience) that produces a second audio signal (e.g., music), as depicted in FIG. 1B (an axiomatic view of a short side of the fader 109). The fader 109 may also be configured with an audio output 117 for connectivity to a wireless speaker, for example. The specific location of the one or more audio inputs 113, one or more auxiliary ports 115, or one or more audio outputs 117 in relation to the fader 109 is merely for illustrative purposes and is largely determined by the manner of integration with the audio component 101. In this instance, an audio input 113, an auxiliary port 115, and an audio output 117 are located on a short side of the fader 109 (e.g., facing a user). In one embodiment, the fader housing 111 provides access to the first connection point and the second connection point. In one embodiment, the fader 109 is operable as a standalone fader when removed from the audio component 101 and/or used in connection with an external audio component (e.g., a smartphone). In one embodiment, the fader 109 includes a rechargeable battery (e.g., a lithium ion battery) (not shown for illustrative convenience).

In one embodiment, the audio component 101 (e.g., a record player) includes a receptacle 119 that is configured to hold the fader 109. In one embodiment, the receptacle 119 is located on an outer edge of the audio component as depicted in FIG. 3A, within a recessed portion of the audio component 101 (e.g., a record player) as depicted in FIG. 1C, or a combination thereof such that the upper surface of the fader housing 111 is substantially flush with the upper surface of the audio component 101 (e.g., a record player), as depicted in FIGS. 1C, 2B, 3C, and 3D. In one embodiment, the shape of the receptacle 119 conforms to the shape of the fader housing 111, as depicted in FIGS. 1C, 2B, and 3C. In one embodiment, the audio component 101 includes more than one receptacle (e.g., receptacles 119, 121, 123, and 125) and/or a receptacle may be moved relative to the audio component 101 (e.g., a record player) to enable the fader 109 to be held in more than one location relative to the audio component 101 (e.g., receptacles 119 and 121), as depicted in FIG. 1A.

In one embodiment, the location of the receptacle 119 or each of the more than one receptacles (e.g., receptacles 119, 121, 123, and 125) is such that the fader 109 and the knob 127 of the fader 109 are vertically aligned with one or more audio controls of the audio component 101 (e.g., the level/volume control fader 129, the speed select switch or toggle 131, the pitch control knob 133, and the tone control 135) creating an integrated DJ mixing area, as depicted in FIGS. 1C and 2B. In one embodiment, the level/volume control fader 129 of the audio component 101 may be moved to the compartment 123, for example, so that the fader 109 and the one or more audio controls of the audio component 101 may all be arranged in a vertical alignment.

Figure 2A:
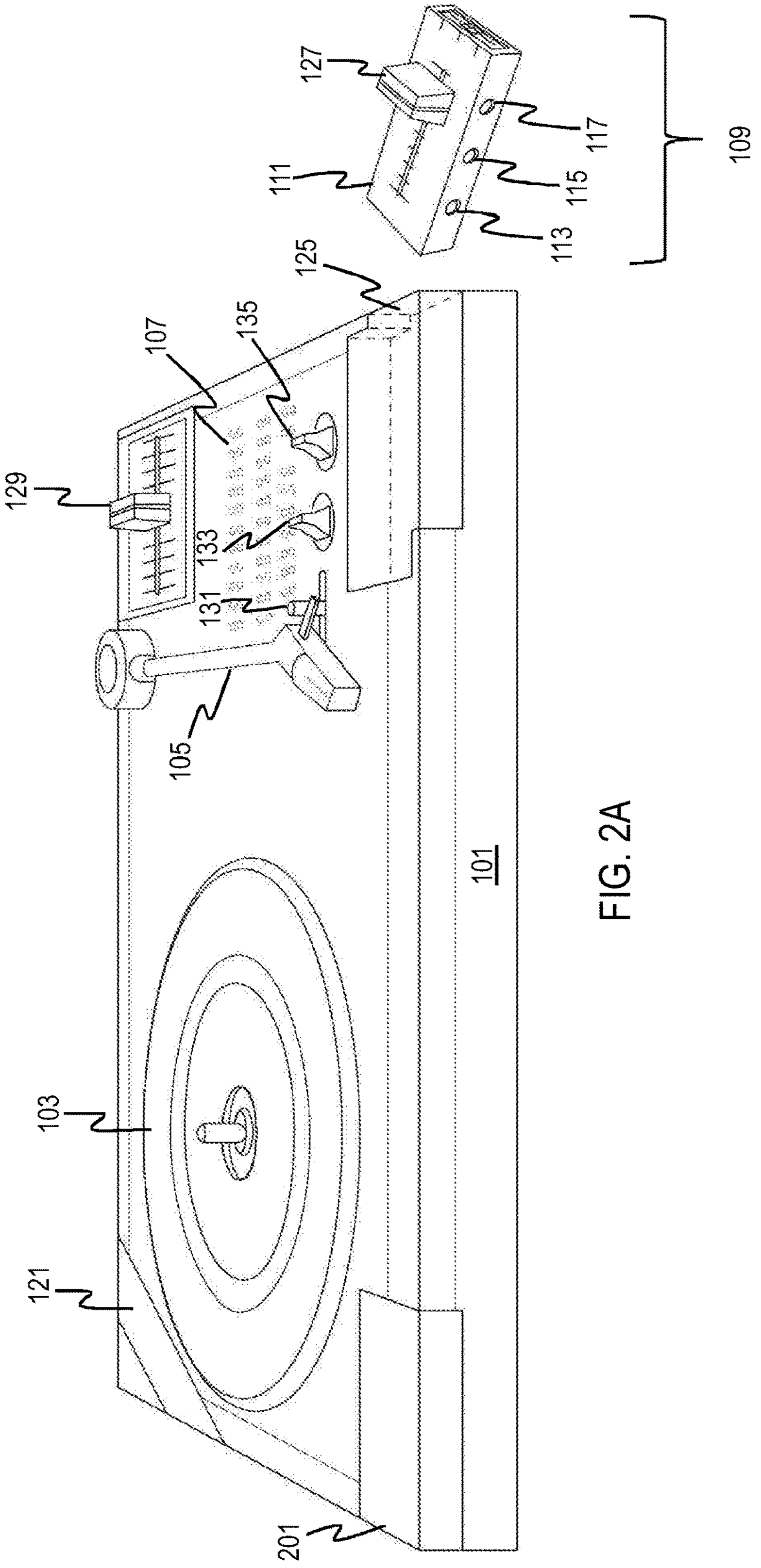
FIGS. 2A through 2D schematically illustrate a removable fader component integrated with an audio component via a recessed receptacle and one or more analog connections, one or more digital connections, or a combination thereof, according to one embodiment.
Figure 2B:
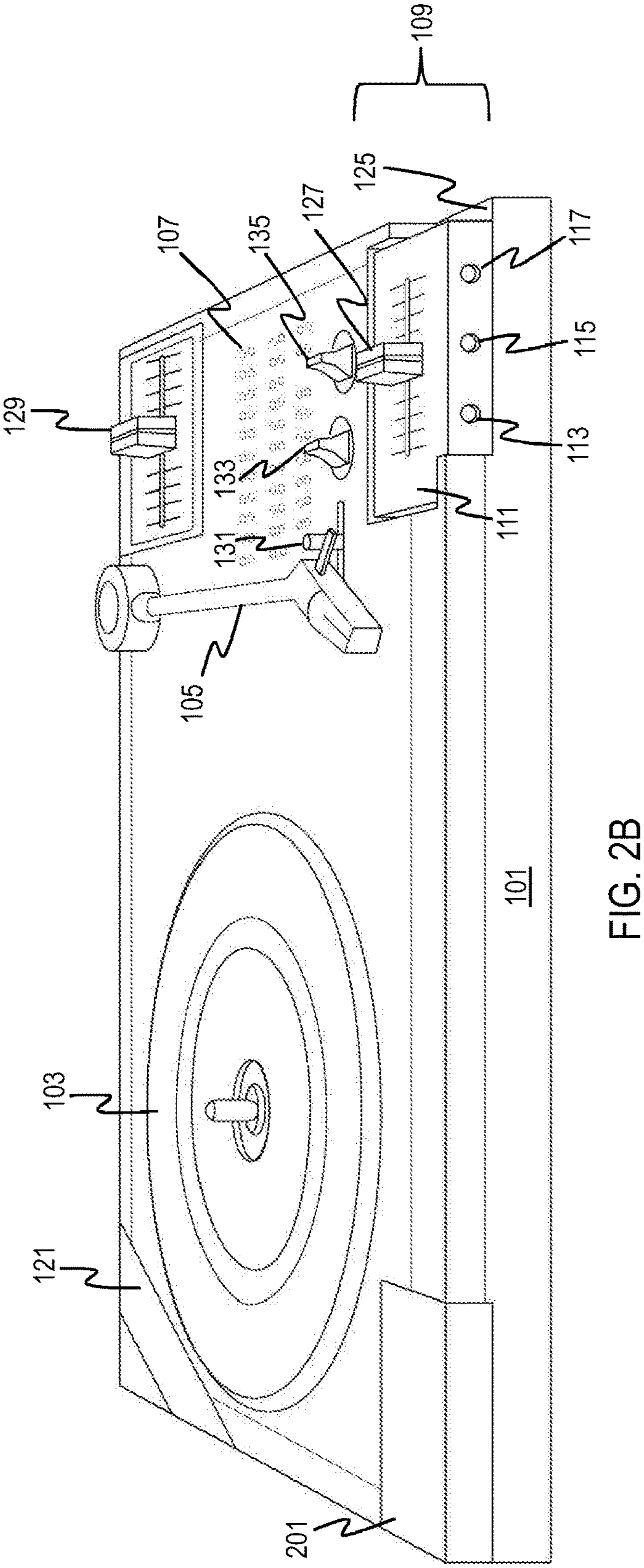
Figure 2C:
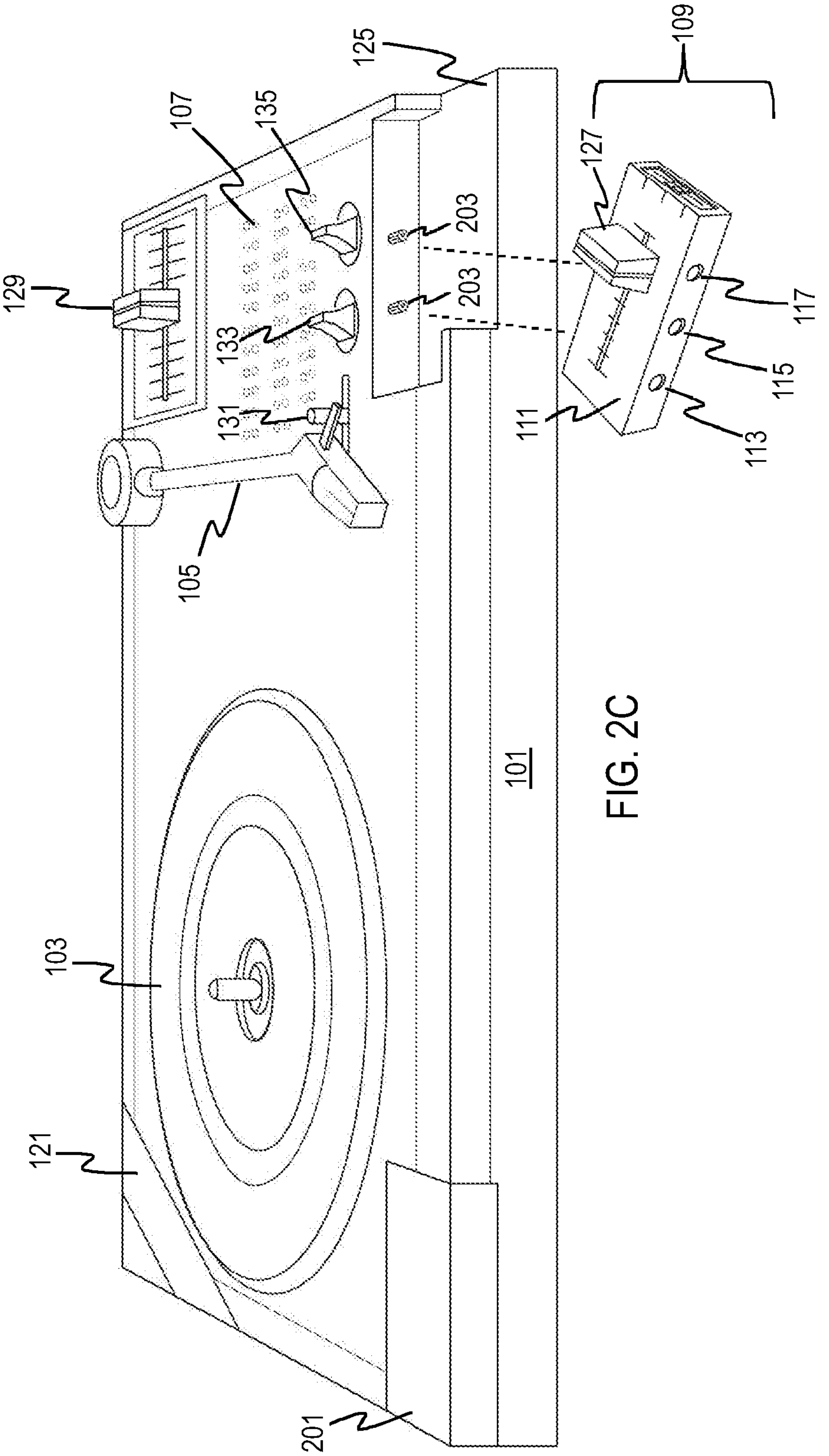
Figure 2D:
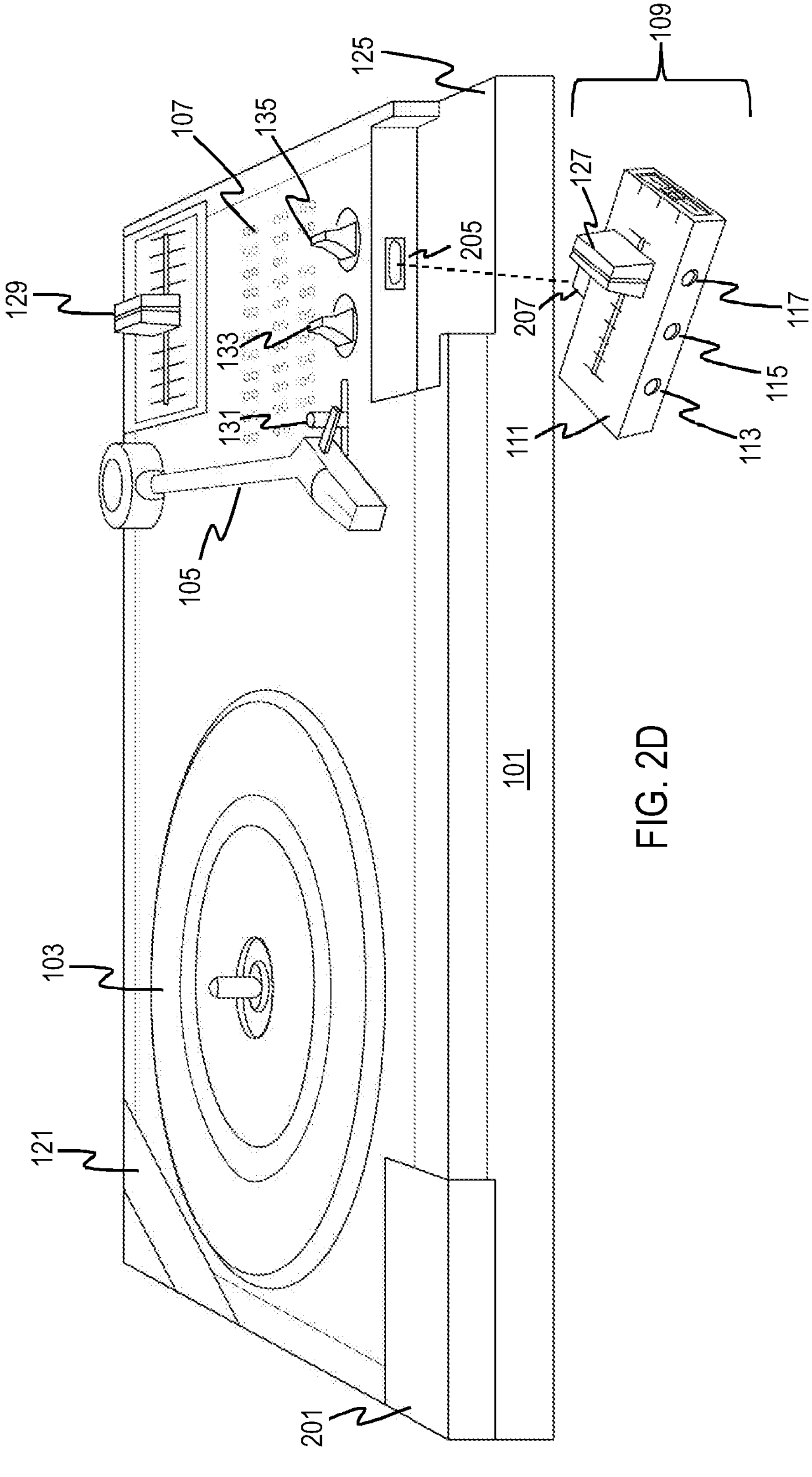
Figure 3A:
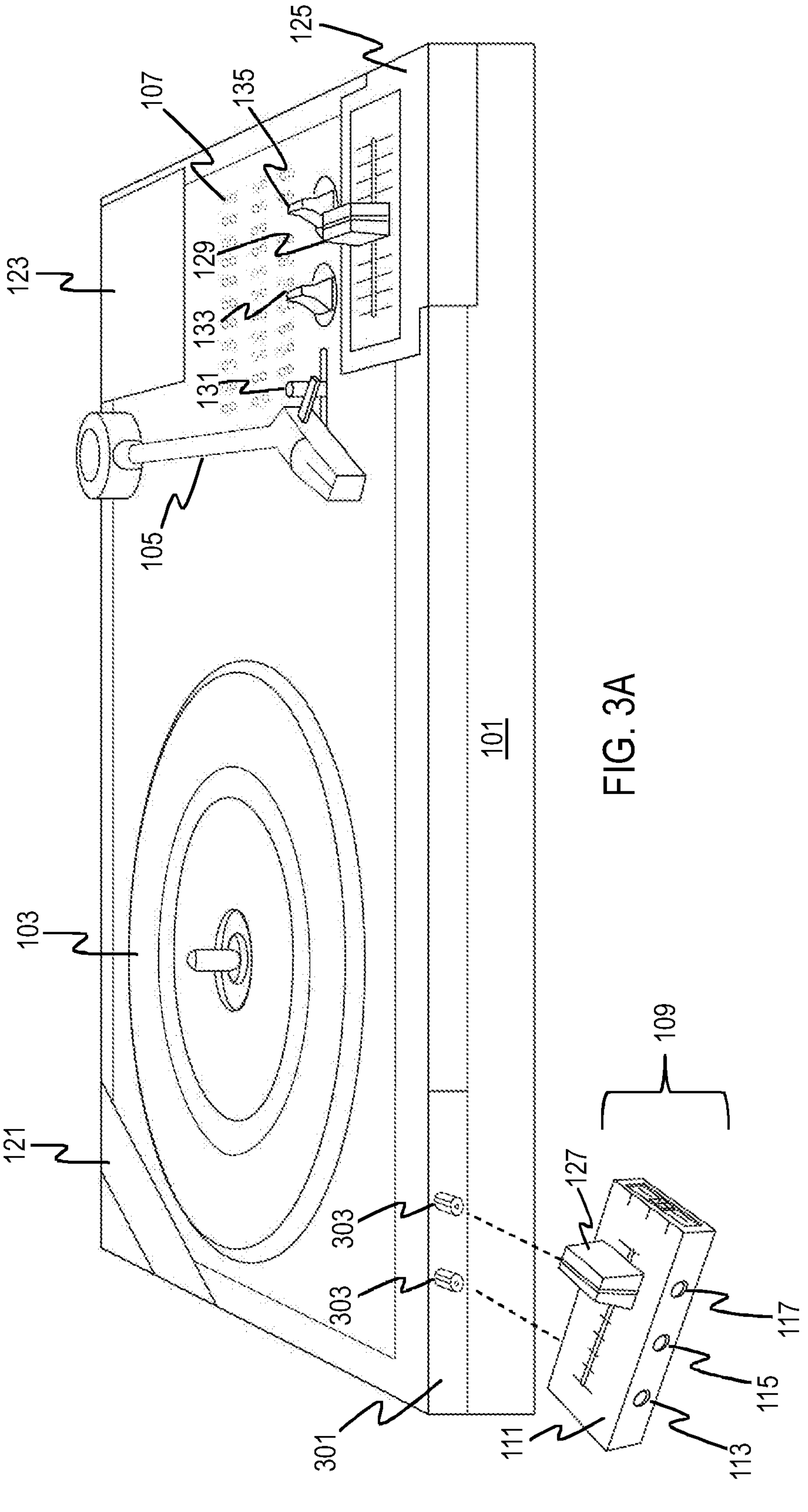
FIGS. 3A through 3D schematically illustrate a removable fader component integrated with an audio component via a receptacle located on an outer edge of the audio component and one or more analog connections, one or more digital connections, or a combination thereof, according to one embodiment.

FIGS. 2A through 2D (axiomatic views) are similar to FIGS. 1A through 1C in that they schematically illustrate a removable fader component integrated with an audio component via a recessed receptacle and one or more analog connections, one or more digital connections, or a combination thereof, according to one embodiment, except that the fader 109 in this instance is integrated with the audio component 101 via receptacle 125 rather than receptacles 119 or 121, as depicted in FIG. 1C. In one embodiment, wherein the fader 109 is integration with the audio component 101 via the receptacle 125, the receptacle 119 may be replaced with the receptacle 201, as depicted in FIG. 2A. In one embodiment, the first connection point and the second connection point of the fader 109 includes an analog connection, a digital connection, or a combination thereof. In one embodiment, an analog connection may be completed by connecting one or more plugs 203 (e.g., formed of copper or gold) to an audio input 113, an auxiliary port 115, or a combination thereof, as depicted in FIG. 2C (one or more audio inputs 113, auxiliary ports 115, or a combination thereof on a backside of the fader 109 are not shown for illustrative convenience). In one embodiment, the one or more plugs 203 are native to the audio component 101 (e.g., a record player) and in one embodiment, the one or more plugs 203 are provided by the manufacturer of the fader 109 to enable a physical integration of the fader 109 and the audio component 101. In one embodiment, an analog connection between the fader 109, the audio component 101 (e.g., a record player), and/or one or more external audio components (e.g., a smartphone and/or a wireless speaker) are achieved via one or more audio cables (not shown for illustrative convenience). In one embodiment, a digital connection may be achieved by one or more short-range wireless communications between the fader 109 and the audio component 101 (e.g., a record player) and, therefore, the one or more plugs 203 may simply provide a means of physical integration between the fader 109 and the audio component 101 (e.g., a record player). In one embodiment, a digital connection may be completed by connecting a USB port 205 of the audio component 101 and a USB connector 207 of the fader 109, as depicted in FIG. 2D. In one embodiment, the audio component 101 (e.g., a record player) may include a USB connecter 207 and the fader 109 may include a USB port 205. In one embodiment, wherein the fader 109 includes a USB port (not shown for illustrative convenience) and a rechargeable battery, the USB port may also be used to recharge the rechargeable battery. In one embodiment, the audio component 101 (e.g., a record player) may also include one or more other external USB ports (not shown for illustrative convenience) to facilitate a connection with an external audio component (e.g., a laptop computer for recording). In one embodiment, once the fader 109 is integrated with the audio component 101 via the USB port 205 in the recessed receptacle 125, the resulting apparatus is identical in appearance to the apparatus depicted in FIG. 2B.

In one embodiment, the one or more audio inputs 113, one or more auxiliary ports 115, and/or one or more audio outputs 117 may be constructed of and/or feature a unique and/or proprietary design requiring the use of special or proprietary connectors or cables to facilitate the transmission of an audio signal between the fader 109 and the audio component 101 (e.g., a record player) and/or an external audio component (e.g., a smartphone or laptop computer). In one embodiment, the fader 109 may be physically integrated with the audio component 101 in a tongue and groove fashion, a mortise and tendon fashion, or a combination thereof facilitating a semi-permanent (LEGO®-like) connection between the fader 109 and the audio component 101 while simultaneously providing access to an audio input 113, an auxiliary port 115, and an audio input 117, as depicted in FIGS. 1C and 2B.

Figure 3B:
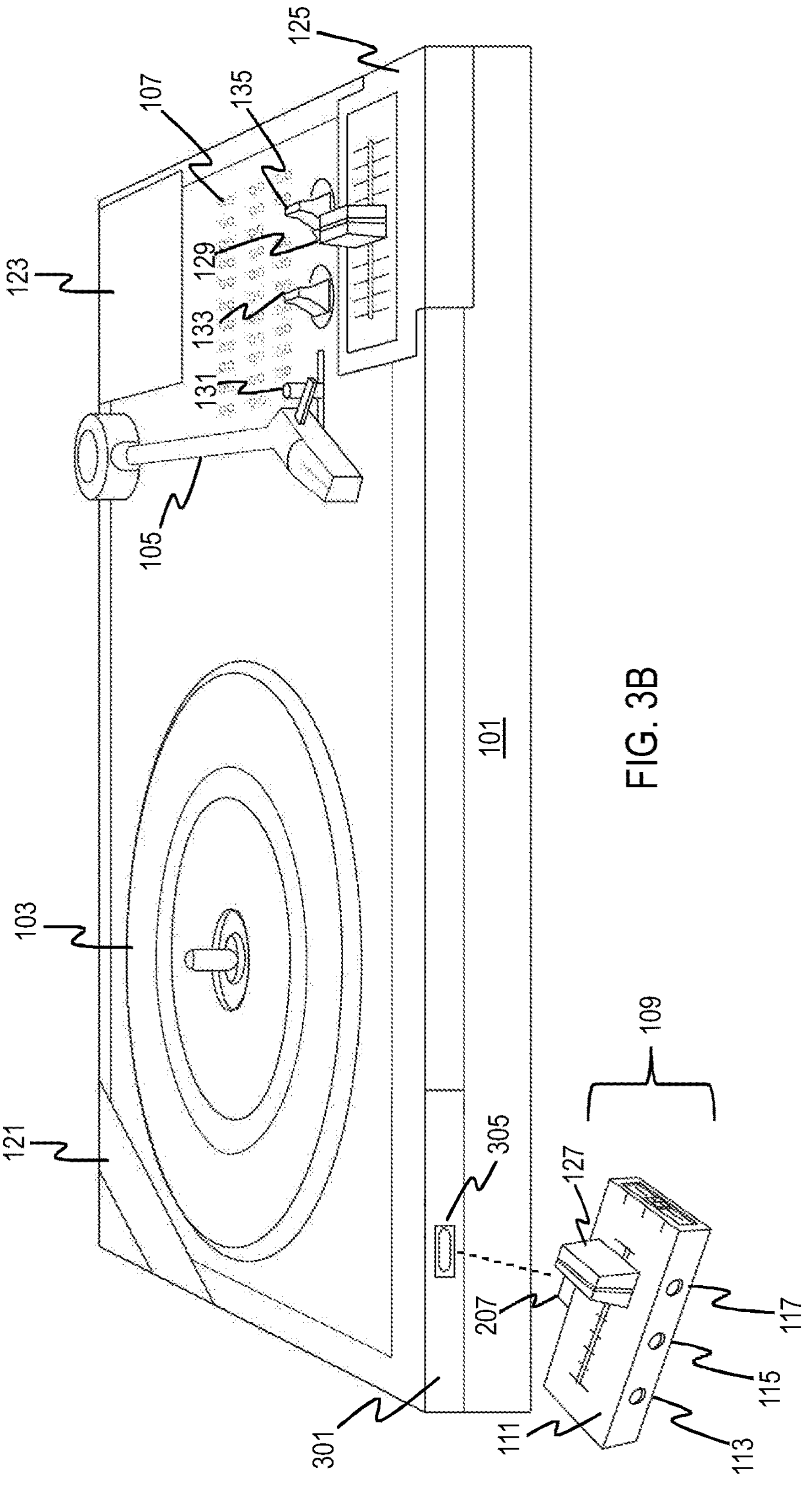
Figure 3C:
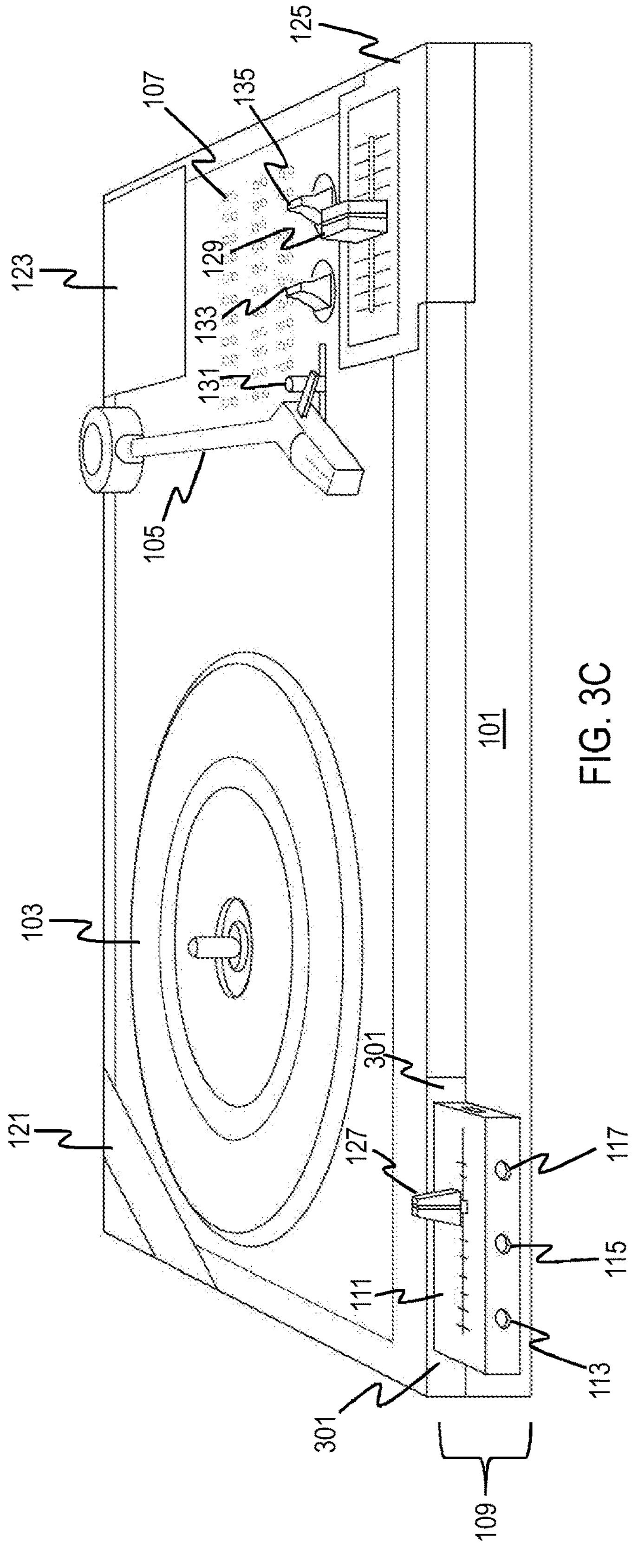
Figure 3D:
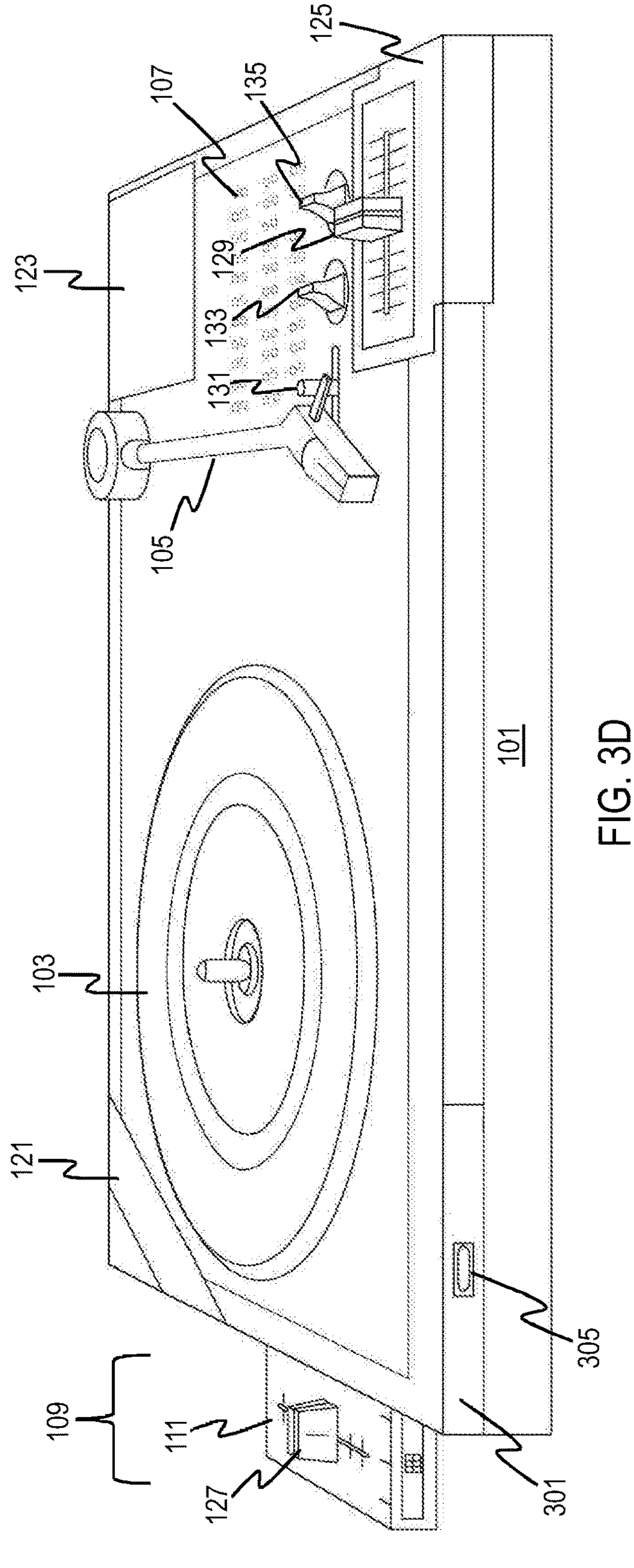

FIGS. 3A through 3D (axiomatic views) schematically illustrate a removable fader component integrated with an audio component via a receptacle located on an outer edge of an audio component (e.g., a record player) and one or more analog connections, one or more digital connections, or a combination thereof, according to one embodiment. In one embodiment, the audio component 101 of FIGS. 3A through 3D is substantially similar to the audio component 101 of FIG. 2B, except that the receptacle 201 has been replaced with the receptacle 301 enabling the fader 109 to be integrated with the audio component 101 on an outer edge of the audio component 101. In one embodiment, an analog connection may be completed by connecting one or more plugs 303 (e.g., formed of copper or gold) to an audio input 113, an auxiliary port 115, or a combination thereof, as depicted in FIG. 3A. In one embodiment the plugs 303 and 203 are identical in terms of their capabilities and/or functions. In one embodiment, a digital connection may be completed by connecting a USB port 305 of the audio component 101 and a USB connector 207 of the fader 109, as depicted in FIG. 3B. In one embodiment, similar to FIG. 2D, the audio component 101 (e.g., a record player) may include a USB connecter 207 and the fader 109 may include a USB port 305 to enable the digital connection.

Figures 4A, 4B, 4C, 4D, 4E, 4F, 4G:
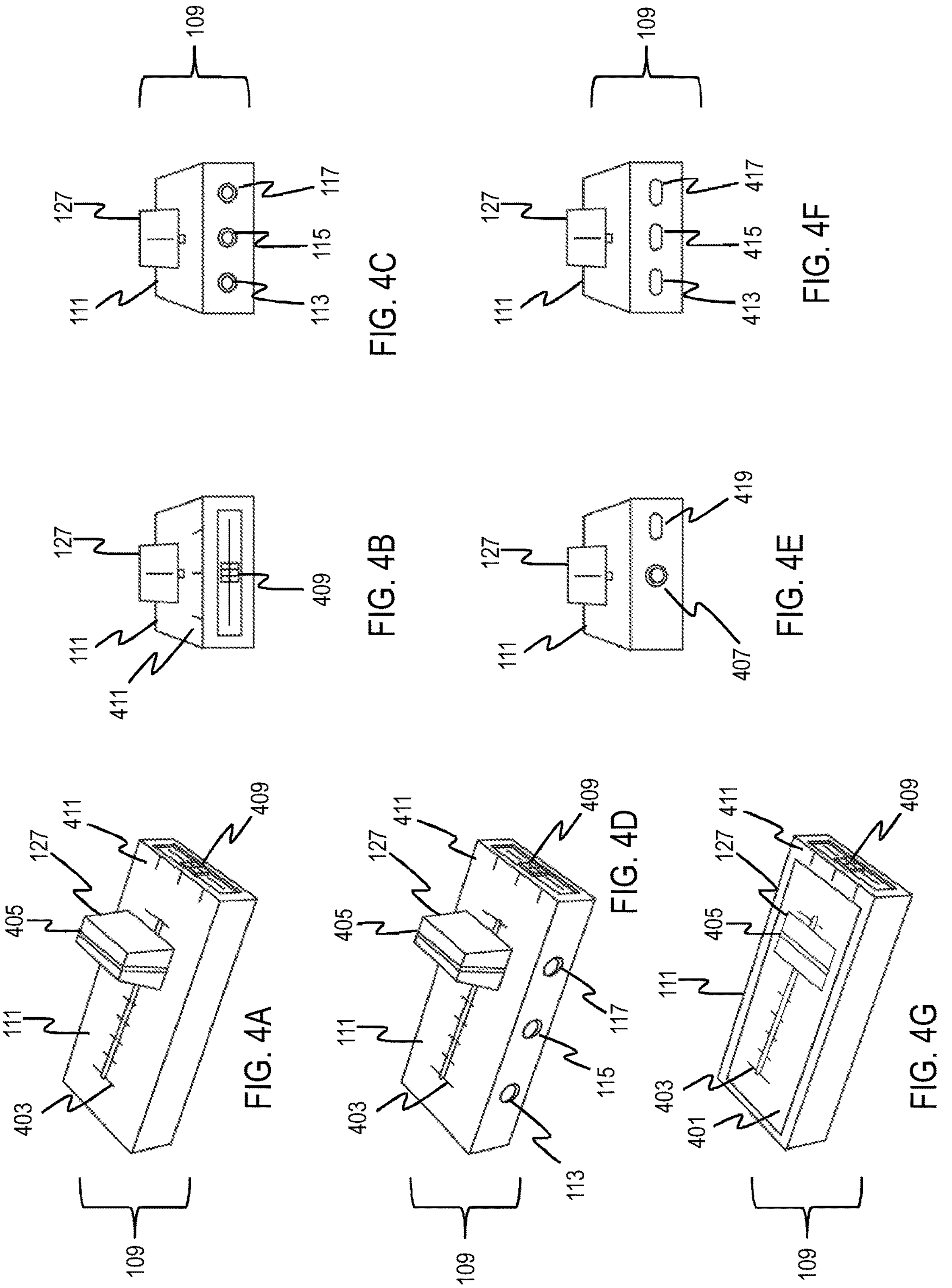
FIGS. 4A through 4G schematically illustrate various analog and/or digital configurations of a removable fader component, according to one embodiment.

FIGS. 4A through 4G (axiomatic views) schematically illustrate various possible configurations of the fader 109, according to one embodiment. FIGS. 4A through 4D illustrate various analog configurations of the fader 109 and FIGS. 4E through 4G illustrate various analog and/or digital configurations of the fader 109. In one embodiment, the fader 109 includes a hardware component, a software component, or a combination thereof (not shown for illustrative convenience) for mixing a first audio signal and a second audio signal. In one embodiment, the mixing is controlled by the knob 127 that may be used by a user (e.g., a DJ) to fade in or amply or fade out or weaken a particular audio source (e.g., a record player). For example, by moving the knob 127 in one direction, a first audio source (e.g., the audio component 101) may be faded in or amplified while simultaneously fading out or weakening a second audio source (e.g., an external audio component). In one embodiment, the knob 127 may be a physical construction as depicted in FIG. 4A, a virtual construction (e.g., included on a touch screen 401 as depicted in FIG. 4G), or a combination thereof. In one embodiment, the fader 109 and/or the knob 127 include one or more features to assist a user to know where the knob 127 and the associated source priority between a first audio signal and a second audio signal are in relation to the fader housing 111 and each other. For example, in one embodiment, the fader housing 111 may include one or more level marks 403. By way of example, the one or more level marks 403 may be painted (e.g., using phosphorescent paint), constructed of one or more elements capable of illumination (e.g., light emitting diodes (LEDs)), or a combination thereof. In one embodiment, the knob 127 may also include one or more marks 405 (e.g., a painted mark, an etched mark, or an LED).

In one embodiment, the hardware component, the software component, or a combination thereof (not shown for illustrative convenience) of the fader 109 may enable user customization of the first connection point, the second connection point, or a combination thereof to facilitate connectivity between the fader 109 and the audio component 101 (e.g., a record player), an external audio component (not shown for illustrative convenience), or a combination thereof. In one embodiment, the specific location of one or more audio inputs 113, one or more auxiliary ports 115, and/or one or more audio outputs 117 may be changed to facilitate integration with the audio component 101. By way of example, an audio input 113, an auxiliary port 115, and an audio output 117 are located on a short side of the fader 109 (e.g., a backside) in FIG. 4C to enable integration with the audio component 101 of FIG. 1A and an audio input 113, an auxiliary port 115, and an audio output 117 are located on a long side of the fader 109 (e.g., facing away from the audio component 101) in FIG. 4D to enable integration with the audio component 101 of FIG. 2B. In one embodiment, the hardware component, the software component, or a combination thereof provides for a user customization of one or more performance characteristics of the fader 109. For example, in one embodiment, the fader 109 includes a button 407 or a three position flat switch 409 that can enable a user (e.g., a DJ) to (a) simultaneously cut off the audio from both the audio component 101 and an external audio component; (b) assign priority to the audio component 101 on one side of the fader 109 and priority to the external audio component on the opposite side of the fader 109; and (c) the same as (b), but reverse "Hamster," as depicted in FIGS. 4E and 4B, respectively. In one embodiment, the position of the button 407 or flat switch 409 (i.e., the "mode" of the fader 109) may be indicated by one or more markings 411 on the fader body 111. In one embodiment, the mode of the fader 109 may also or alternatively be indicated by various corresponding LED colors (e.g., emanating from the one or more level marks 403 and/or the one or more marks 405). In one embodiment, the hardware component, the software component, or a combination thereof may also be programmed post-production via computer software described herein to enable further personalization (e.g., modifying the latency of the fader 109). In one embodiment, the fader 109 may be programmed while physically integrated with the audio component 101 (e.g., a record player) and/or while the fader 109 is removed from the audio component 101 and/or used in connection with an external audio component (e.g., a laptop computer). In one embodiment, the fader 109 may include one or more digital (e.g., USB) audio inputs 413, auxiliary ports 415, and audio outputs 417, as depicted in FIG. 4F. In one embodiment, the fader 109 may also include a USB port 419 next to the button 407 to enable charging of an enclosed battery (e.g., a lithium ion battery) (not shown for illustrative convenience).

In one embodiment, the digital connection between the fader 109 and an external audio component (not shown for illustrative convenience) is via a short-range wireless connection (e.g., Bluetooth®, near field communication (NFC), or the like). In one embodiment, when the fader 109 and an external audio component are connected by a short-range wireless connection, the external audio component may include a record player, a DDJ device, a compact disc player, a digital media player, a smartphone, a tablet computer, a laptop computer, a drumbeat machine, a piano keyboard, recording software, a touch screen, or any device capable of transmitting one or more audio files via the short-range wireless connection. In one embodiment, the external audio component may also include a wireless speaker. By way of example, a user (e.g., a DJ) may manipulate the priority assigned by the fader 109 between a first audio source (e.g., the audio component 101) and a second audio source (e.g., a smartphone) via a Bluetooth® connection.

Figure 5A:
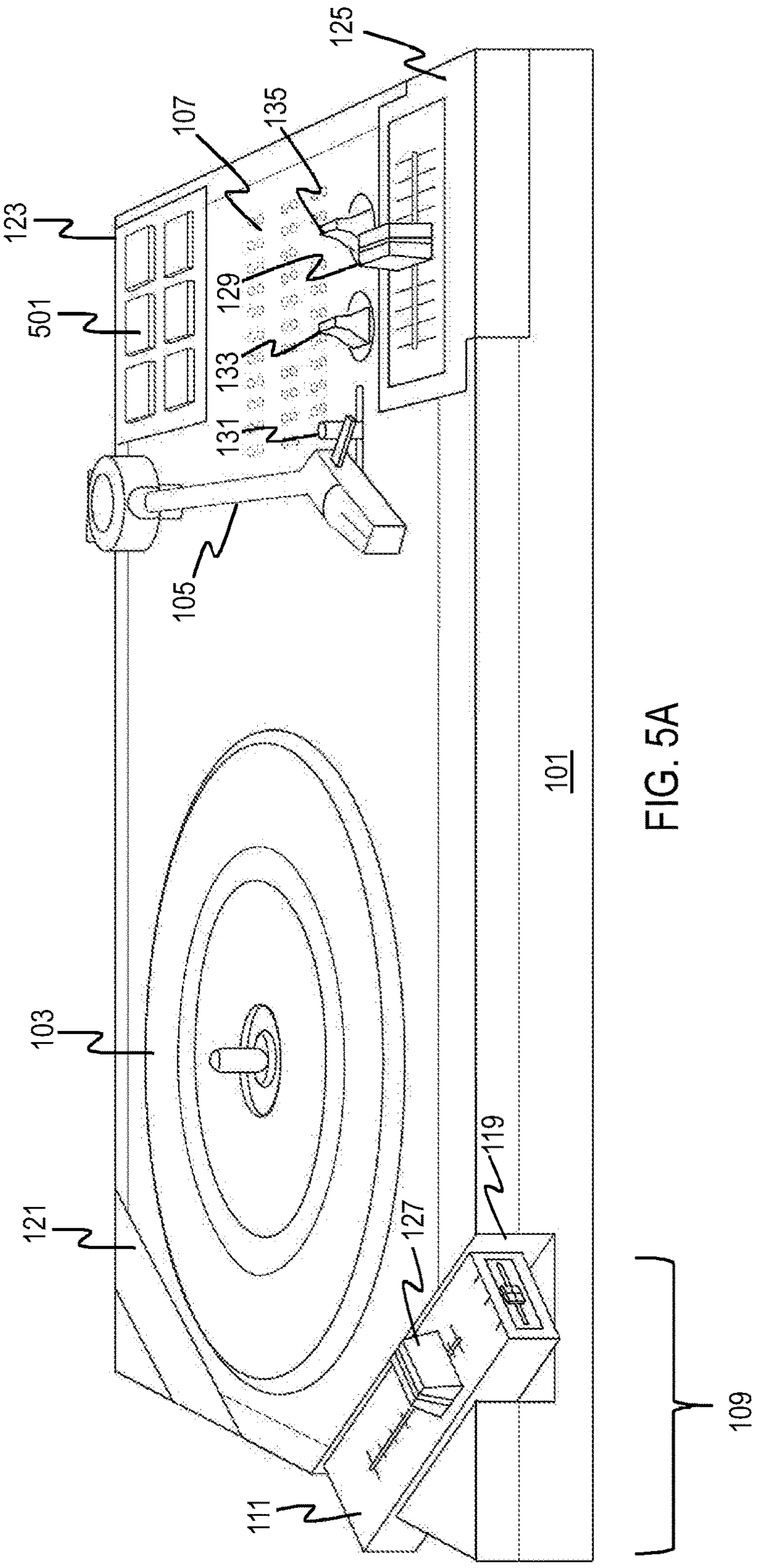
FIGS. 5A through 5E schematically illustrate a removable fader component and various external audio components simultaneously integrated with an audio component one or more recessed receptacles and via one or more analog connections, one or more digital connections, or a combination thereof, according to one embodiment.
Figure 5B:
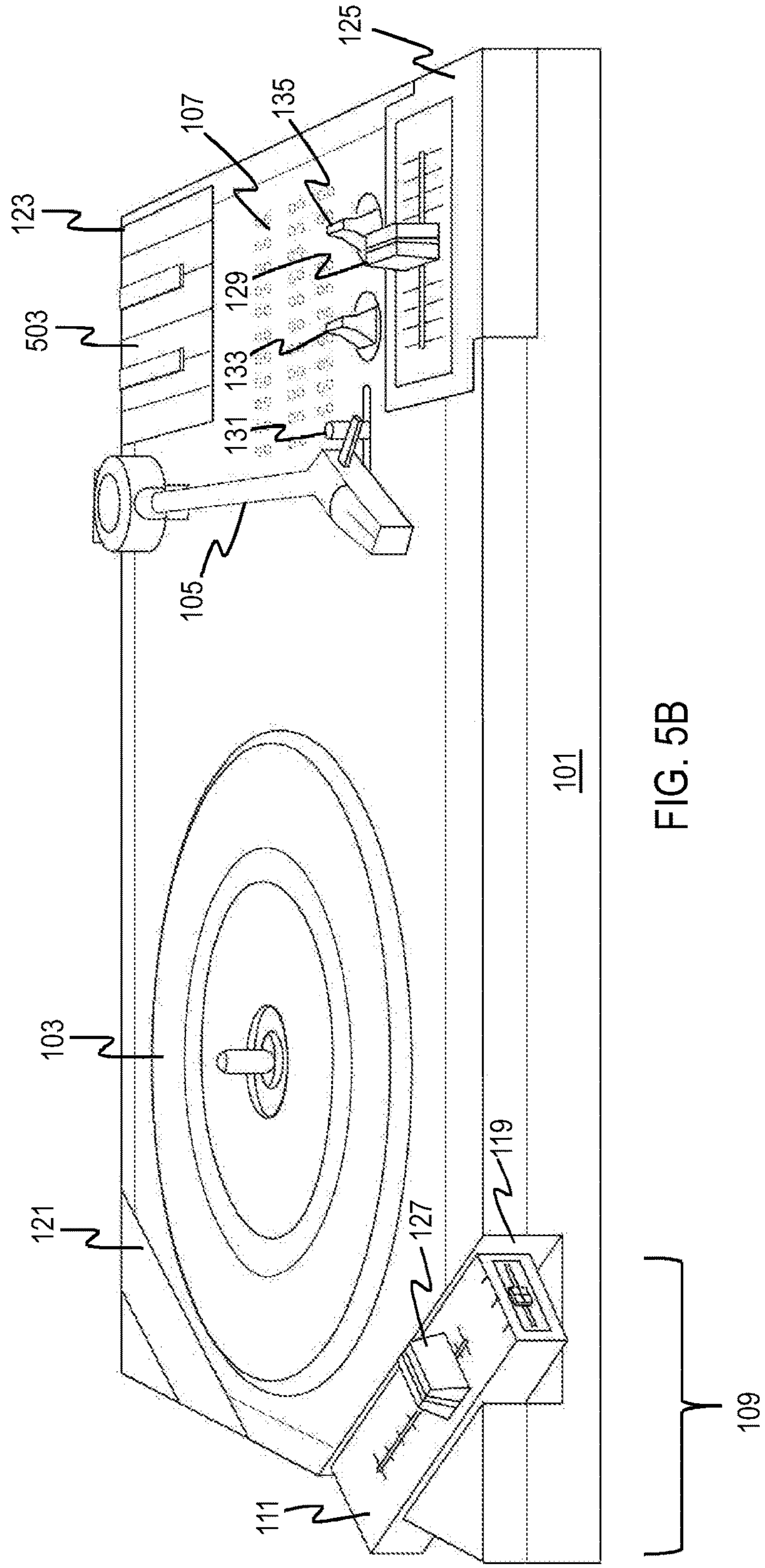
Figure 5C:
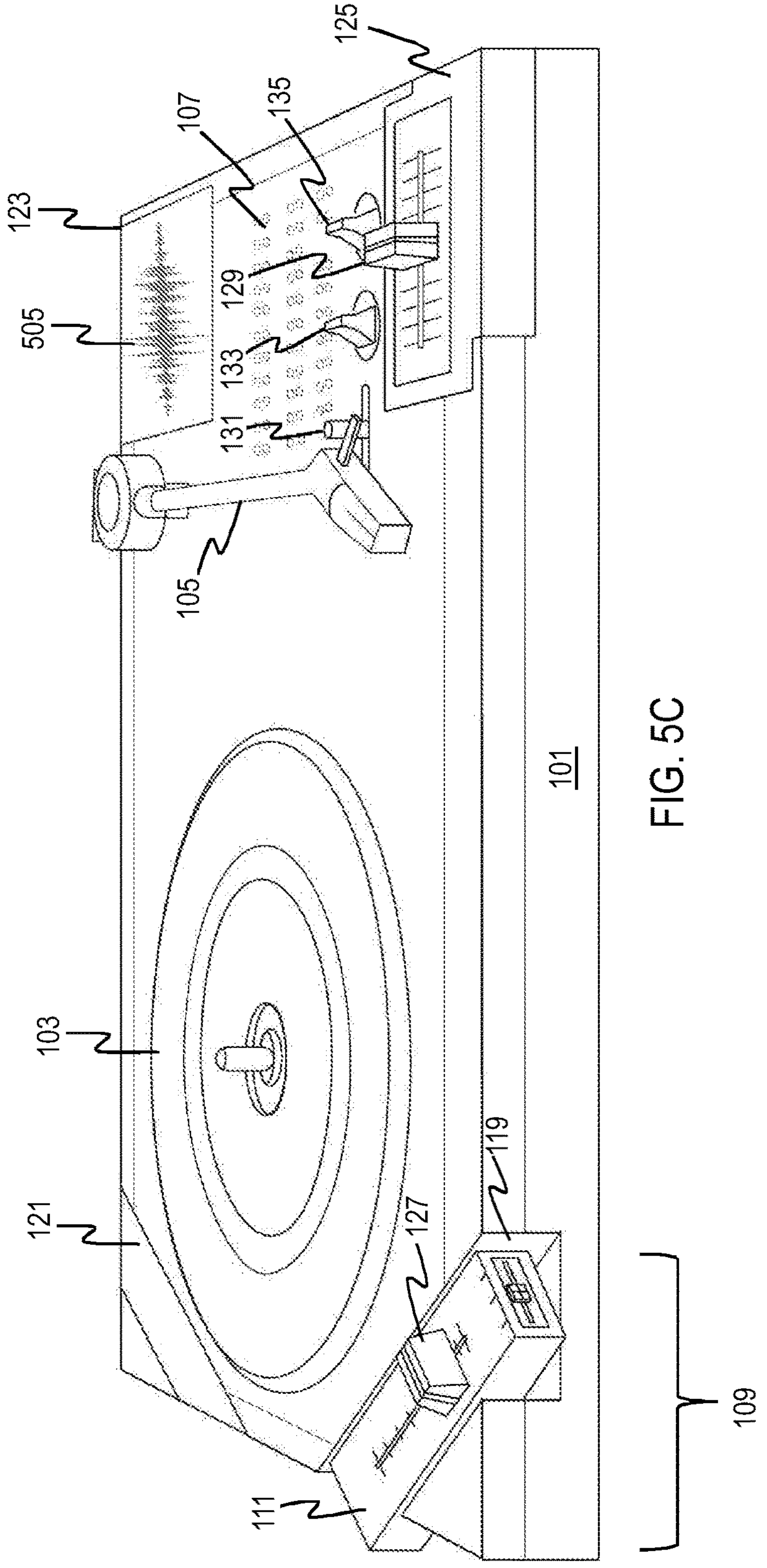
Figure 5D:
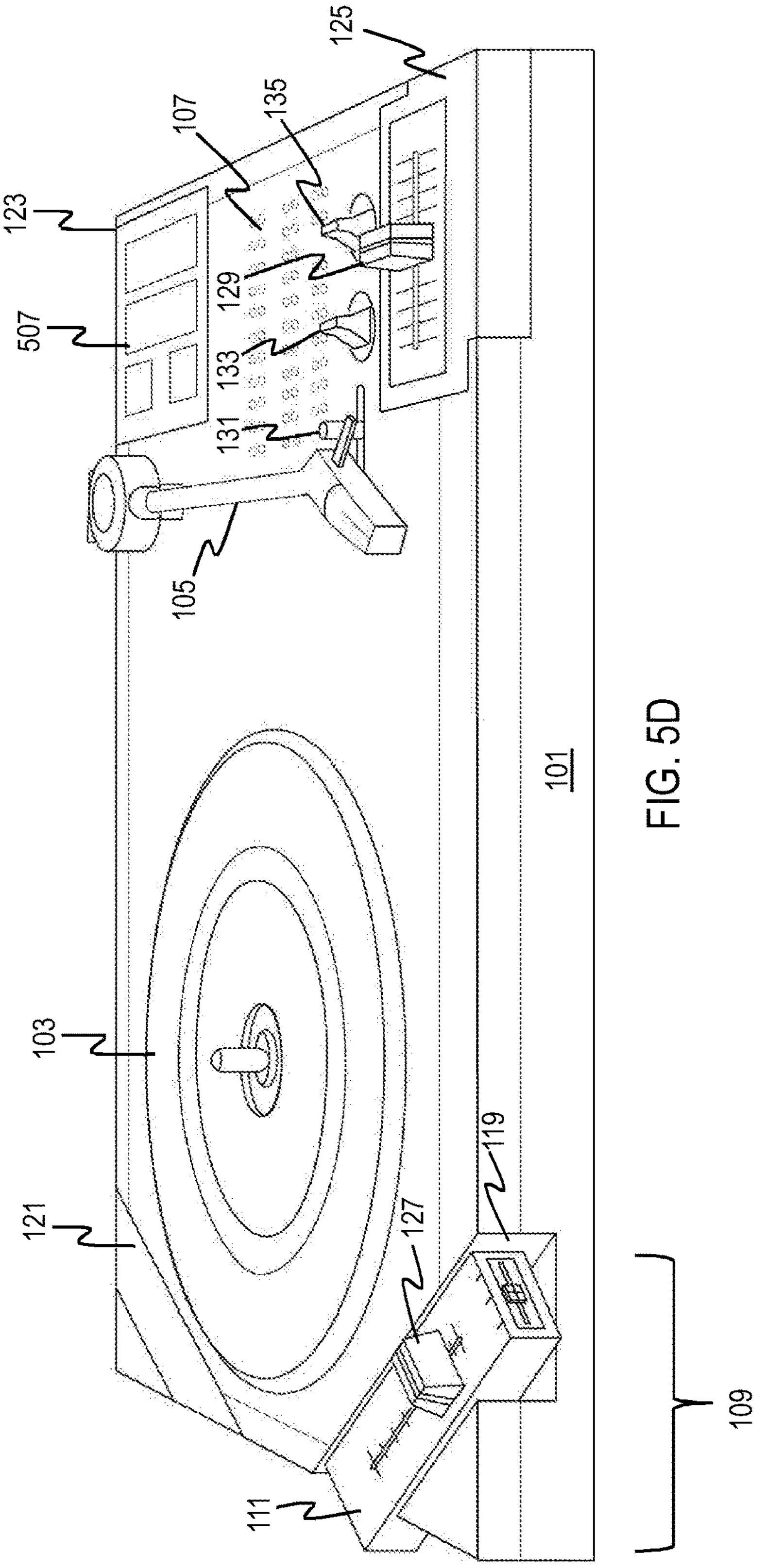
Figure 5E:
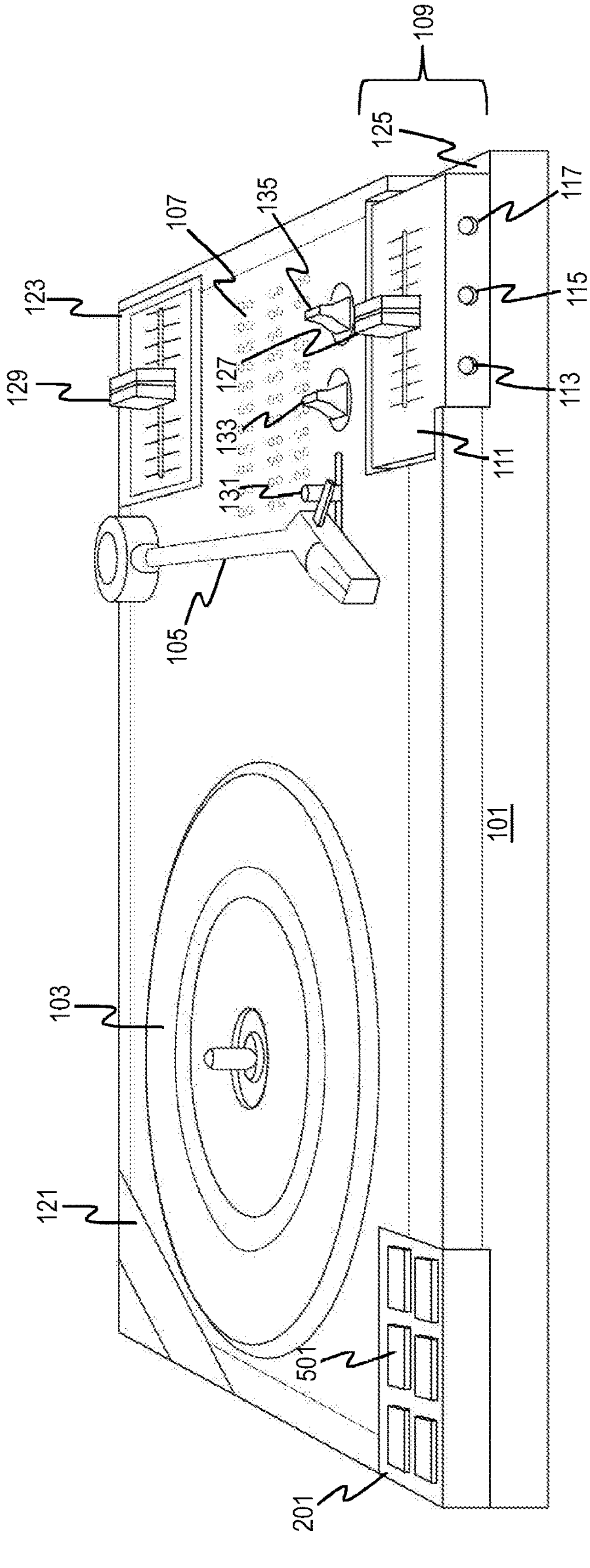

FIGS. 5A through 5E (axiomatic views) schematically illustrate a removable fader component and various external audio components simultaneously integrated with an audio component via one or more analog connections, one or more digital connections, or a combination thereof, according to one embodiment. In one embodiment, the audio component 101 (e.g., a record player) includes a separate hardware component, software component, or combination thereof (not shown for illustrative convenience) for integrating the audio component 101 with an external audio component such as a drumbeat machine 501, a piano keyboard 503, recording software 505, or a touch screen 507, as depicted in FIGS. 5A through 5D, respectively. In one embodiment, the drumbeat machine 501, the piano keyboard 503, the recording software 505, or the touch screen 507 may also be integrated with the audio component 101 via the receptacle 201, as depicted in FIG. 5E. In one embodiment, the recording software 505 and the touch screen 507 may consist of a single external audio component (not shown for illustrative convenience). In one embodiment, the touch screen 507 may also include and/or have the capability to represent the various standard audio controls of the audio component 101 (e.g., the volume control fader 129, the speed select switch or toggle 131, the pitch control knob 133, and the tone control 135). In one embodiment, one or more external audio components may simultaneously be connected with the audio component 101 (e.g., the drumbeat machine 501 and the piano keyboard 503) via one or more receptacles and/or one or more external USB connections of the audio component 101. In one embodiment, when an external audio component (e.g., the drumbeat machine 501) is connected to the audio component 101 (e.g., a record player), the external audio component can work independently with the audio component 101 and the fader 109 can still have the capability to control the audio signal from the audio component 101 and/or the external audio component (i.e., function as an on/off switch). In one embodiment, the separate hardware component, software component, or combination thereof provides for a user to add or remove one or more external audio components (e.g., the drumbeat machine 501) to or from the audio component 101 (e.g., a record player) and thereby further personalize the audio component 101 based on one or more user requirements or preferences (e.g., performing at a concert versus practicing scratching at home).

Figure 6A:
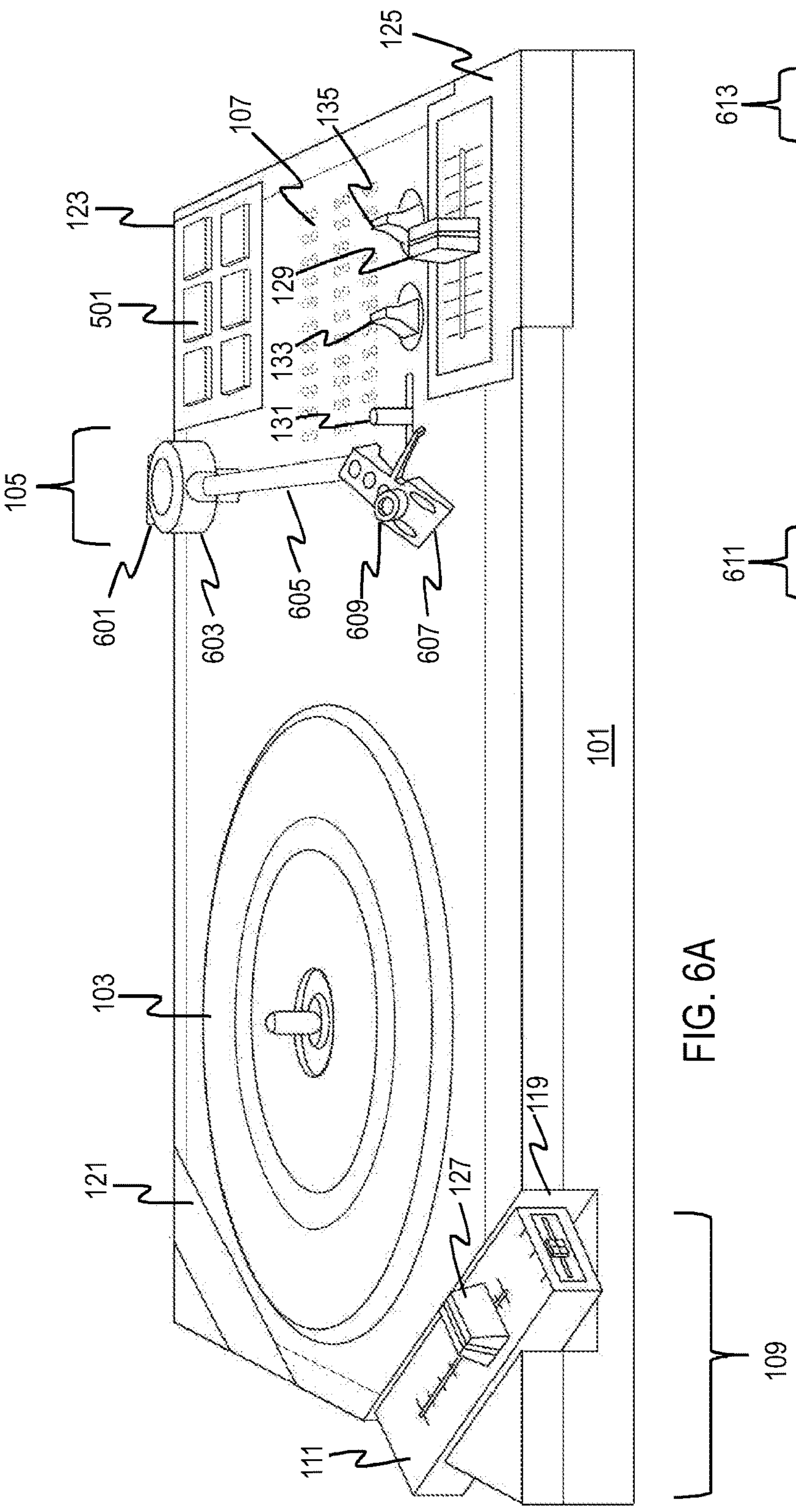
FIGS. 6A through 6C schematically illustrate a record player tone arm headshell unit and adjustable weights, according to one embodiment.
Figure 6B:
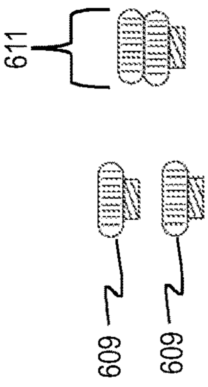
Figure 6C:
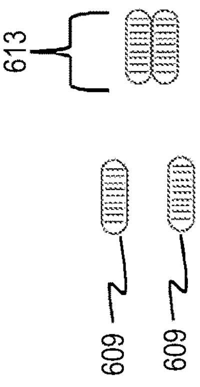

FIGS. 6A through 6C schematically illustrate a tone arm headshell unit and adjustable weights, according to one embodiment. FIG. 6A is an axiomatic view and FIGS. 6B and 6C are cross-sectional views. In one embodiment, wherein the audio component 101 is a record player (e.g., a direct drive or belt drive turntable) the tone arm 105 may also include a needle pressure adjuster 601, a pivot portion 603, an arm shaft 605, a headshell 607, and a cartridge including a needle (both not shown for illustrative convenience). In one embodiment, the headshell 607 is designed to allow one or more weights 609 (e.g., 2 gram or 4 gram weights) to be attached to the headshell 607 to help prevent skipping, as depicted in FIG. 6A. In one embodiment, the one or more weights 609 may be stored in a receptacle of the audio component 101 (e.g., receptacle 121). In one embodiment, the audio component 101 (e.g., a record player) is portable and can be plugged into an outlet (e.g., using a detachable power cable) or it can run on standard or rechargeable batteries (e.g., D batteries).

In one embodiment, the one or more weights 609 may be screwed together forming the combined unit 611 before being attached to the headshell 607, as depicted in FIG. 6B. In one embodiment, the one or more weights 609 may be magnetically combined forming the combined unit 613 before being attached to headshell 607, as depicted in FIG. 6C.

Figure 7:
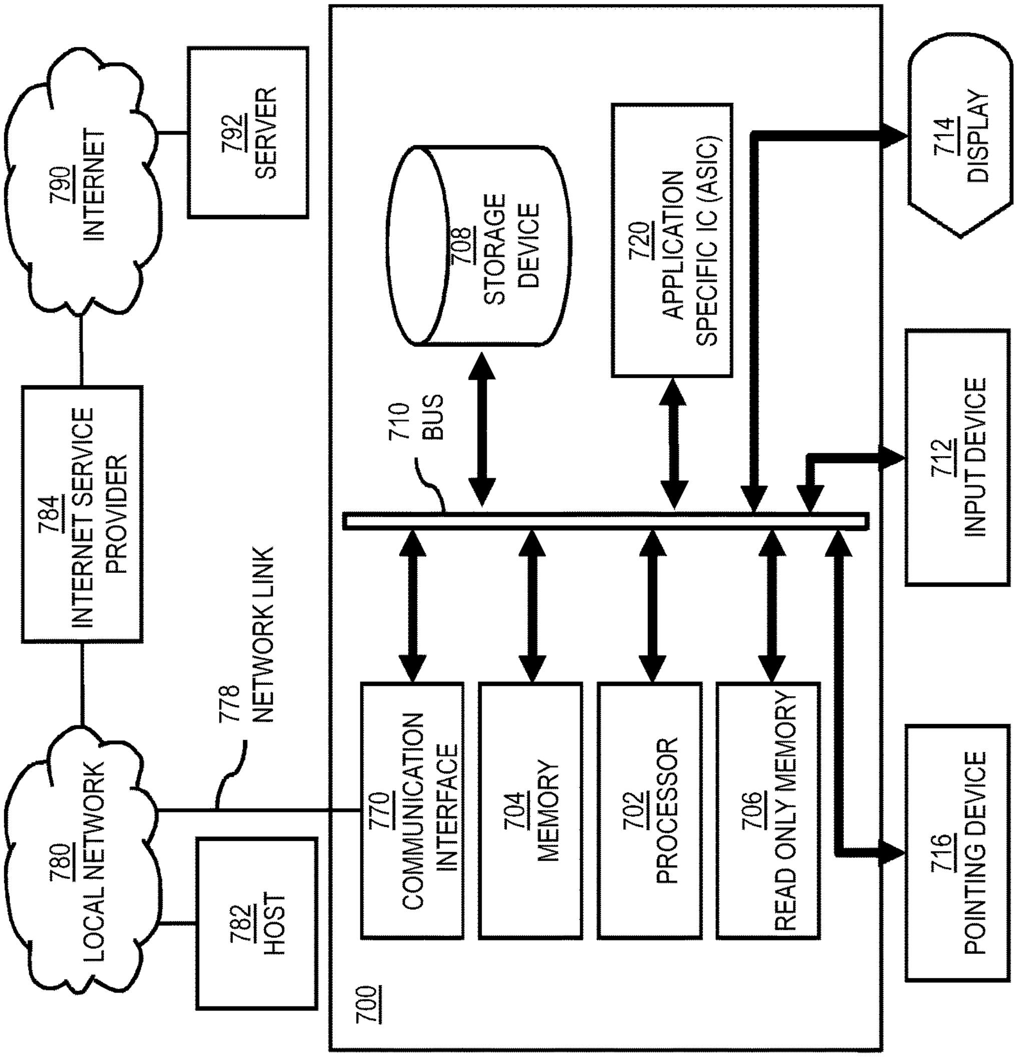
FIG. 7 is a diagram of hardware that can be used to implement an embodiment of the invention.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
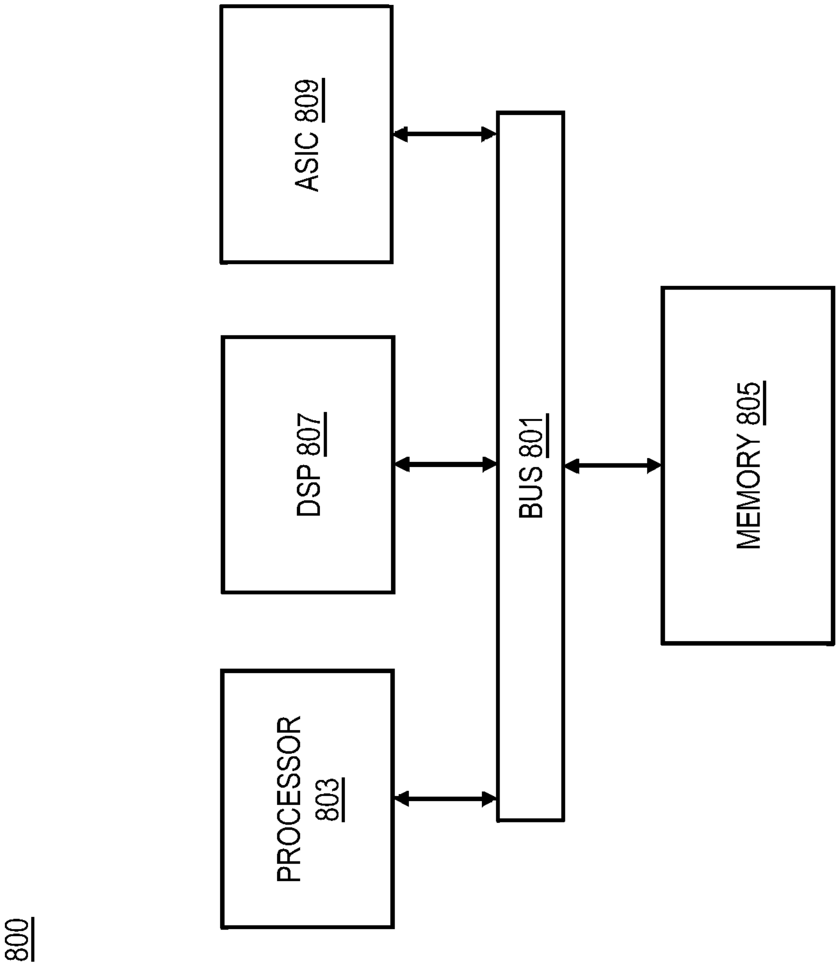
FIG. 8 is a diagram of a chip set that can be used to implement an embodiment of the invention.

FIG. 8 illustrates a chip set or chip 800 upon which an embodiment of the invention may be implemented. Chip set 800 is programmed to deliver messages to a user based on their activity status as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of enabling the transmission of files independent of a file transfer application or the throughput capabilities of the sending or receiving devices.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to deliver messages to a user based on their activity status. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An apparatus, comprising:

an audio component configured to produce a first audio signal;

a removable fader component configured with a first connection point for connectivity to the audio component and a second connection point for connectivity to an external audio component that produces a second audio signal, wherein a hardware component, a software component, or a combination thereof for performing a mixing of the first audio signal and the second audio signal is contained within the removable fader component;

a first receptacle integrated into the apparatus, wherein the first receptacle is configured to hold the removable fader component to the apparatus;

a second receptacle integrated into the apparatus;

another removable fader component configured to control the audio component or the external audio component, the another removable fader component being configured to be held by the second receptacle; and a third receptacle integrated into the apparatus, wherein the third receptacle is configured to receive at least one of a drumbeat machine or a piano keyboard.

2. The apparatus according to claim 1, wherein the removable fader component is enclosed within a fader housing that provides access to the first connection point and the second connection point, and wherein the removable fader component is operable as a standalone fader when removed from the apparatus.

3. The apparatus according to claim 2, wherein the receptacle is located on an outer edge of the audio component, within a recessed portion of the audio component, or a combination thereof such that an upper surface of the fader housing is substantially flush with an upper surface of the audio component.

4. The apparatus according to claim 3, wherein a shape of the recessed portion conforms to a shape of the fader housing.

5. The apparatus according to claim 2, wherein the removable fader component and/or a knob of the removable fader component include one or more features to indicate where the knob and associated source priority between the first audio signal and the second audio signal are in relation to the fader housing.

6. The apparatus according to claim 5, wherein the removable fader component includes a button or switch to change the associated source priority.

7. The apparatus according to claim 1, wherein the second receptacle is integrated along an identical side of the apparatus as the first receptacle.

8. The apparatus according to claim 1, wherein a location of the first receptacle vertically aligns the removable fader component and a knob of the removable fader component with one or more audio controls of the audio component.

9. The apparatus of according to claim 1, wherein the first receptacle is movable relative to the audio component to enable the removable fader component to be held in more than one location relative to the audio component.

10. The apparatus according to claim 9, wherein each of the more than one location vertically aligns the removable fader component and a knob of the removable fader component with one or more audio controls of the audio component.

11. The apparatus according to claim 1, wherein the first connection point and the second connection point includes an analog connection, a digital connection, or a combination thereof.

12. The apparatus according to claim 11, wherein the audio component includes a separate hardware component, software component, or combination thereof for connecting the audio component to the external audio component by the analog connection, the digital connection, or the combination thereof.

13. The apparatus according to claim 11, wherein the analog connection, the digital connection, or the combination thereof is a proprietary design.

14. The apparatus according to claim 11, wherein the digital connection is a Universal Serial Bus (USB) connection.

15. The apparatus according to claim 11, wherein the digital connection between the removable fader component and the external audio component is a short-range wireless connection.

16. The apparatus according to claim 15, wherein the removable fader component is connected to the external audio component by the short-range wireless connection, the external audio component includes a smartphone, a laptop computer, a tablet computer, a wireless speaker, or any device capable of transmitting one or more digital files via the short-range wireless connection.

17. The apparatus according to claim 1, wherein the hardware component, the software component, or the combination thereof provides for a user customization of the first connection point, the second connection point, or a combination thereof to facilitate connectivity of the removable fader component to the audio component, the external audio component, or a combination thereof.

18. The apparatus according to claim 1, wherein the hardware component, software component, or a combination thereof provides for a user customization of one or more performance characteristics of the removable fader component.

19. The apparatus according to claim 17, wherein the user customization is available while the removable fader is held by the receptacle or removed from the apparatus.

20. The apparatus according to claim 1, wherein the audio component, the external audio component, or a combination thereof includes a record player, a digital disc jockey (DDJ) device, a compact disc player, a digital media player, a smartphone, a tablet computer, a laptop computer, the drumbeat machine, the piano keyboard, recording software, a touch screen, or a wireless speaker.

* * * * *